United States Patent [19]

Woolston

[11] 4,128,886
[45] Dec. 5, 1978

[54] MAXIMUM WEB SPEED MONITOR

[75] Inventor: Allan B. Woolston, Wynnewood, Pa.

[73] Assignee: Molins Machine Company, Inc., Cherry Hill, N.J.

[21] Appl. No.: 777,973

[22] Filed: Mar. 15, 1977

[51] Int. Cl.² .................... G05B 5/00; B26D 5/38
[52] U.S. Cl. ........................... 364/475; 83/74; 234/50; 340/670; 340/673; 364/570
[58] Field of Search ............... 83/38, 72–76; 234/49, 50; 340/259, 263; 365/94; 364/475, 570

[56] References Cited

U.S. PATENT DOCUMENTS

| | | | |
|---|---|---|---|
| 3,626,457 | 12/1971 | Duerr et al. | 83/74 |
| 3,668,957 | 6/1972 | Nido | 83/37 |
| 3,774,171 | 11/1973 | Regitz | 365/94 |
| 3,956,617 | 1/1976 | Schmidt | 235/151.1 |
| 3,949,359 | 4/1976 | Sorkin | 340/263 |
| 3,982,454 | 9/1976 | Schneider et al. | 83/74 |
| 4,015,183 | 3/1977 | Miyakita | 83/76 |
| 4,020,406 | 4/1977 | Tokuno et al. | 83/74 |

Primary Examiner—Felix D. Gruber
Attorney, Agent, or Firm—Seidel, Gonda & Goldhammer

[57] ABSTRACT

A maximum web speed monitor for limiting the speed of a moving web which is cut into sheets by a knife such as a rotary knife. A digital cut-off control provides separate signals indicative of the web speed and the length of sheets into which the web is cut by the knife. A digital integrator repetitively provides a sample signal indicative of the actual speed of the web based on a preselected sampling interval. Information representative of maximum permissible web speed as a function of sheet length is stored in a PROM. The web speed is prevented from exceeding a maximum permissible speed as a function of the maximum permissible web speed information and the sample signal.

8 Claims, 3 Drawing Figures

4,128,886

MAXIMUM WEB SPEED MONITOR

BACKGROUND OF THE INVENTION

The present invention is directed to a maximum web speed monitor. In particular, the invention is directed to a maximum web speed monitor for use with a digital cut-off control.

Maximum web speed monitors are known in the art. For example, see U.S. Pat. Nos. 3,956,617 to Schmidt and 3,626,457 to Duerr et al. Heretofore, such web speed monitors included rather elaborate circuitry for computing maximum web speed. The circuitry had to be specially hard-wired to fit the peculiar characteristics of each machine. For example, in the monitor described in U.S. Pat. No. 3,956,617, as many as thirty separate logic gates were required for the computation. Further, the gates had to be separately connected to a diode matrix to finish the computation. The diode matrix itself was custom hard-wired at the factory to suit the characteristics of a particular cut-off machine. Accordingly, the interconnections between the gates and the diode matrix was objectionably complicated. To alleviate the congested circuit interconnections, outputs of specific gates could be ignored. Thus, maximum web speed control could be exercised only for short and long sheet lengths with control over intermediate lengths being sacrificed. In effect, then, there could not be a maximum web speed control over the full range of sheet lengths.

Multiplicity of logic gates and associated wiring interconnections is undesirable. It increases susceptibility to wiring errors and electrical failure. Additionally, it increases the difficulty of troubleshooting and efficiently repairing defective components. Moreover, such controls could not conveniently be altered in the field to suit changes in the operating characteristics of a cut-off machine. And omission of the monitoring function for certain sheet lengths reduced the effectiveness of such controls.

To date, there is an unmet need for a maximum web speed monitor which is modular in design and which minimizes the interconnections between internal system components. There is, moreover, a need for a web speed monitor which is readily programmable in the field and which exercises control over the full range of sheet lengths.

An advantage of the present invention is that it significantly reduces the number of circuit components and wiring interconnections therebetween.

Another advantage of the invention is that it permits relatively simple and efficient troubleshooting and repair of the system components.

Another advantage of the invention is that it is field programmable.

A further advantage of the invention is that it is easily re-programmed to suit the operating characteristics of a wide variety of cut-off machines without having to return the system to the factory for re-wiring and the like.

A still further advantage of the invention is that it permits monitoring of the maximum web speed over the full range of sheet lengths.

Other advantages appear hereinafter.

BRIEF SUMMARY OF THE INVENTION

A maximum web speed monitor for limiting the speed of a moving web which is cut into sheets by a knife in a cut-off machine having means for providing a signal indicative of the actual length of a sheet cut by the knife from a moving web and means for providing a signal indicative of the speed of the web. A first means repetitively provides a sample signal indicative of the actual speed of the moving web during a preselected sampling interval based on the web speed signal. A second programmable means addressable by the actual sheet length signal stores information representative of the maximum permissible speed of the web as a function of sheet length based on the sampling interval. Comparator means operatively associated with the first and second means compares the stored maximum permissible speed information to the sample signal substantially instantaneously with the production of the actual sheet length signal and provides a signal indicative of whether the web speed exceeds the maximum permissible speed.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DETAILED DESCRIPTION OF THE INVENTION

Figure 1:
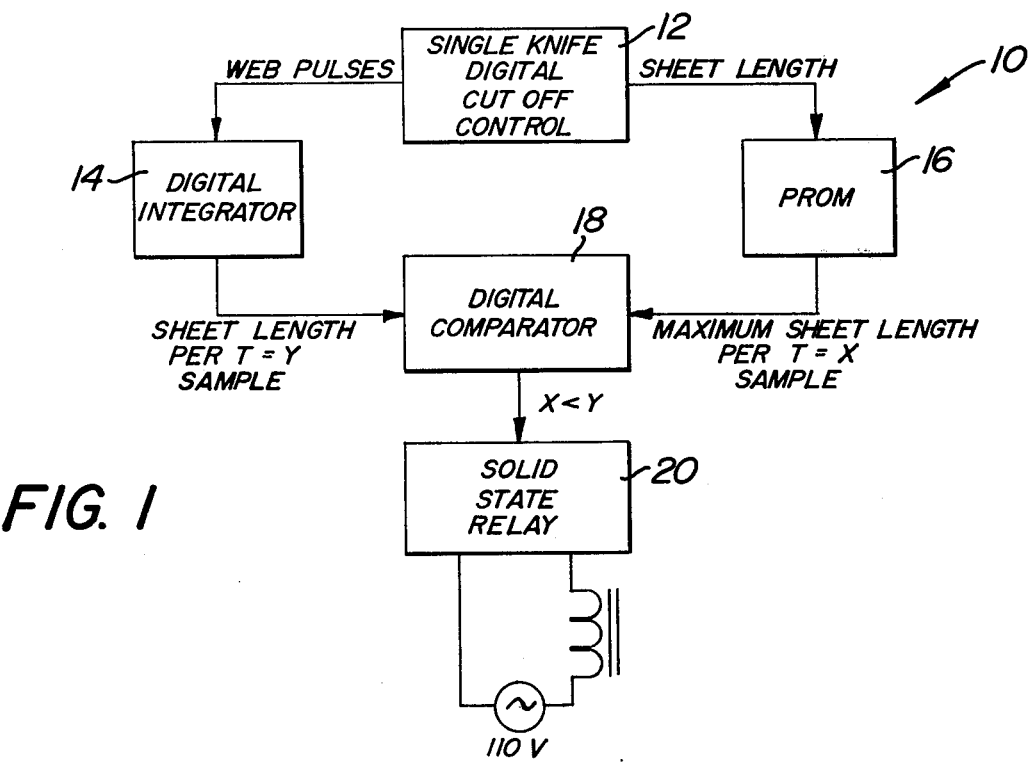
FIG. 1 is a block diagram of a maximum web speed monitor for limiting the speed of a single web in accordance with the principles of the present invention.

Referring to the drawings in detail wherein like numerals indicate like elements, there is shown in FIG. 1 a maximum web speed monitor constructed in accordance with the principles of the present invention designated generally as 10. A digital cut-off control 12 such as that described in U.S. patent application Ser. No. 678,562 in the name of the inventor herein and assigned to the assignee herein cuts a moving web into sheets of uniform length. For the purposes of describing the background of the present invention, application Ser. No. 678,562 is incorporated herein by reference.

The moving web is repetitively severed by a knife mechanism to manufacture sheets of corrugated board having uniform length. For purposes of description herein of the preferred embodiment of the invention, the knife mechanism is assumed to be of the rotary type. The knife mechanism, however, could be other than of the rotary type, for example, a shuttling knife mechanism, without exceeding the spirit or scope of the invention. The speed of the web and the knife mechanism determines the length of the sheets being cut. In the case of the rotary knife mechanism, a variable speed transmission drives the knife mechanism at a fraction of the web speed. A cyclic mechanism is coupled to the variable speed transmission to decelerate and accelerate the knife mechanism so that it travels one revolution between cuts and the knife cylinders move at web speed at the instant of cut. There are definite settings of the cyclic mechanism and variable speed transmission for each length of sheet cut from the web. These settings are effected simultaneously and synchronously by a positioning motor. Detection of the speed of the web is accomplished by a measuring wheel which is a rotary transducer element driven by the web. Typically, the measuring wheel produces a digital pulse for each 0.01 inches of web travel. Alternatively, detection of the speed of the web may be accomplished by a shaft encoder associated with the line shaft which drives the web. Detection of the speed of the knife mechanism is accomplished by a knife encoder which is an impulse transducer such as a magnetic pick-up or the like. The knife encoder generates a digital pulse for each revolution of the knife. The measuring wheel and knife encoder signals are used to compute the actual length of the sheet being cut from the web.

The acceleration and deceleration of the knife cyclic mechanism causes very high stresses to be generated in the apparatus particularly at the extremes of web speed and sheet length. If too great, these forces can result in mechanical damage to the apparatus.

Heretofore, charts of maximum web speed versus sheet length were affixed to the cut-off apparatus to assist the operator in supervising the maximum web speed. Lately, automatic web speed monitors have been used in replacement of manual operator control. See U.S. Pat. No. 3,956,617. Such automatic controls include rather elaborate designs which require special attention in wiring and which hamper rapid and efficient troubleshooting and repair. Such controls, in addition, may not provide web speed control over the full range of sheet lengths. Moreover, such controls are not amenable to programming in the field.

In the present invention, modular circuitry is employed to effect web speed control over the full range of sheet lengths. The circuitry can be rapidly and efficiently tested and repaired, and the circuitry is easily programmed in the field without having to disconnect the controls for return to the factory.

Referring to FIG. 1, wherein there is shown a maximum web speed control for a single cut-off machine in accordance with the present invention, a digital integrator 14 and a programmable read-only memory (PROM) 16 are operatively connected to the digital cut-off control 12. Preferably, the digital integrator 14 includes a counter and latch in combination with a clock oscillator for repetitively computing the actual speed of the sheet being cut by the knife mechanism. The counter accumulates web pulses generated by the measuring wheel or line shaft encoder at the output of the cut-off control 12. The clock oscillator repetitively enables the counter to accumulate the web speed pulses over a preselected sampling interval designated "Tsample". At the end of the sampling interval, the clock oscillator clears the counter and transfers the count to the latch, thereby enabling the counter to accumulate web speed pulses over the next sampling interval. Accordingly, at the end of each sampling interval, the output of the digital integrator 14, that is the count stored in the latch, is representative of sheet length. This operation is equivalent to a sample computation of web speed.

At the end of each sampling interval, the output of the digital integrator 14 is compared to the output of PROM 16 to monitor the maximum speed of the web. The digital integrator, more specifically the clock oscillator, therefore determines the frequency of the comparison function. The greater the frequency, the greater will be the accuracy of the web speed control effected by the system. Typically, the frequency of the comparison function may be 10 Hz.

Alternatively, the state of the counter in digital integrator 14 could be continuously compared to the output of the PROM 16 during each sampling interval, and the latch could be eliminated.

The PROM 16 is programmed by conventional techniques to store information representative of the maximum travel of a sheet during the preselected sampling interval for particular sheet lengths which can be cut by the knife mechanism. The cut-off control 12 computes the actual length of a sheet cut by the knife mechanism between successive cuts of the knife as is well known in the art. This actual sheet length signal is used to address the PROM 16. Corresponding to the actual sheet length signal, there is a maximum permissible sheet length programmed in the PROM. Since this maximum permissible sheet length is based on the sampling interval, it is indicative of maximum permissible web speed for the length of sheet being cut by the knife mechanism.

The comparator 18 compares the output of the digital integrator 14 with the output of the PROM 16 at the end of each sampling interval. If, at the end of a sampling interval, the web speed signal at the output of the digital integrator exceeds the maximum permissible web speed signal at the output of the PROM, the digital comparator 18 generates a signal "X<Y" which actuates a web drive control element such as a solid state relay 20. Actuation of the relay 20 causes the web drive to reduce the speed of the web to the maximum permissible speed. As a result, the acceleration and deceleration of the cyclic mechanism is brought within acceptable limits.

Conventionally, the moving web is first slit into two or more separate webs, and the separate webs are cut to length by discrete knife mechanisms. The web speed monitor shown in FIG. 2 may be employed to limit the maximum speed of both such webs. In each cut-off machine, there are separate cyclic mechanisms and cut-off controls 22 associated with each knife mechanism. Each cut-off control produces a signal indicative of the length of the sheets being cut by the knife mechanism associated therewith. Each control has a knife encoder which produces a signal indicative of the moment that the associated knife mechanism cuts a sheet from the moving web. A signal measuring wheel or line shaft encoder may be employed for both controls to provide the web pulses as previously described.

The web pulses are accumulated by digital integrator 14' over repetitive preselected sampling intervals as previously described. At the end of each sampling interval, the output of the digital integrator is compared with the output of a PROM 16' by digital comparator 18'.

Figure 2:
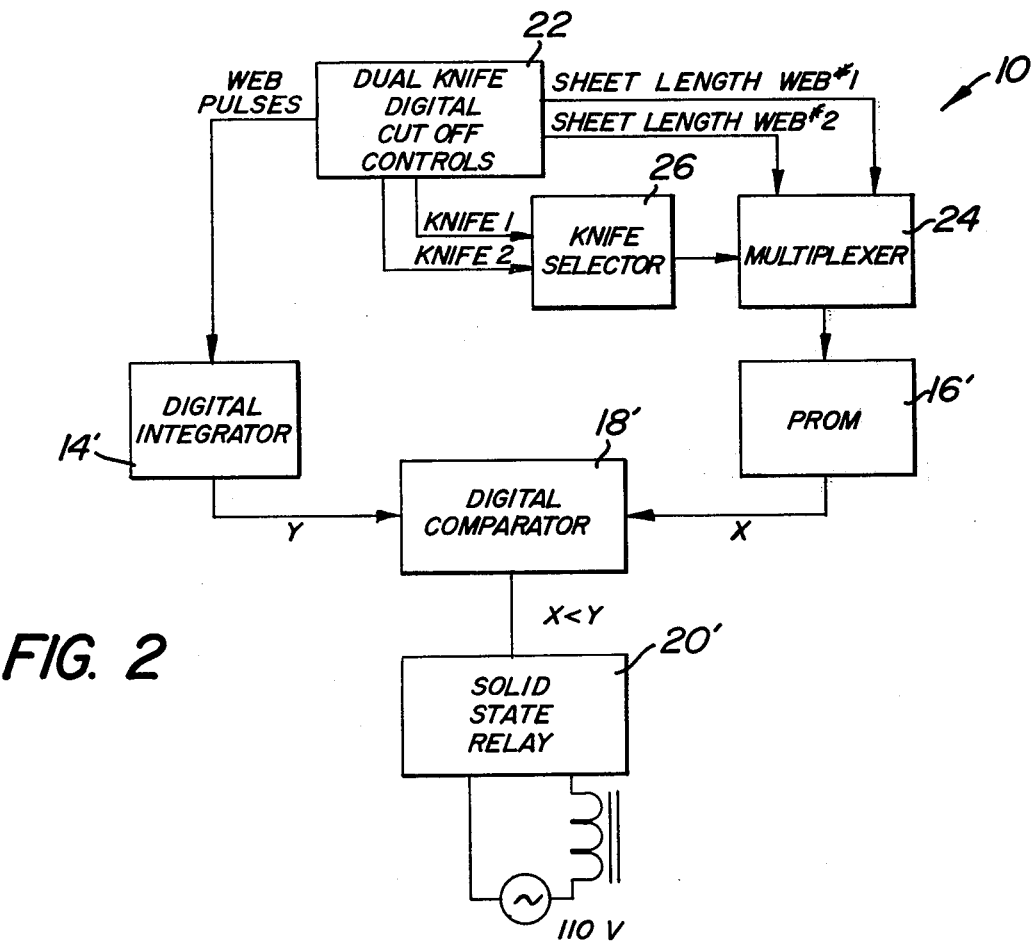
FIG. 2 is a block diagram of a maximum web speed monitor for limiting the speeds of at least two webs in accordance with the principles of the present invention.

In the system shown in FIG. 2, it is presumed that the cyclic mechanisms associated with each knife have identical or substantially the same operating characteristics. Accordingly, a single PROM 16' may be employed to store information of maximum permissible web speed as a function of actual sheet length for each knife mechanism. The PROM 16' is addressed by a multiplexer 24. The multiplexer 24 alternately addresses the PROM 16' with the actual sheet length signals provided by cut-off controls 22 corresponding to the first and second moving webs. The multiplexing operation is supervised by a knife selector circuit 26 which may be a flip-flop or equivalent bi-stable element which alternately changes state in response to the signals provided by the knife encoders in cut-off controls 22. These signals serve to indicate the moments that each moving web is cut by its associated knife mechanism.

If, at the end of any sampling interval, the sample web speed signal at the output of integrator 14' exceeds the maximum permissible speed indicated at the output of PROM 16', the comparator 18' actuates solid state relay 20' to bring the web speed within tolerable limits.

Figure 3:
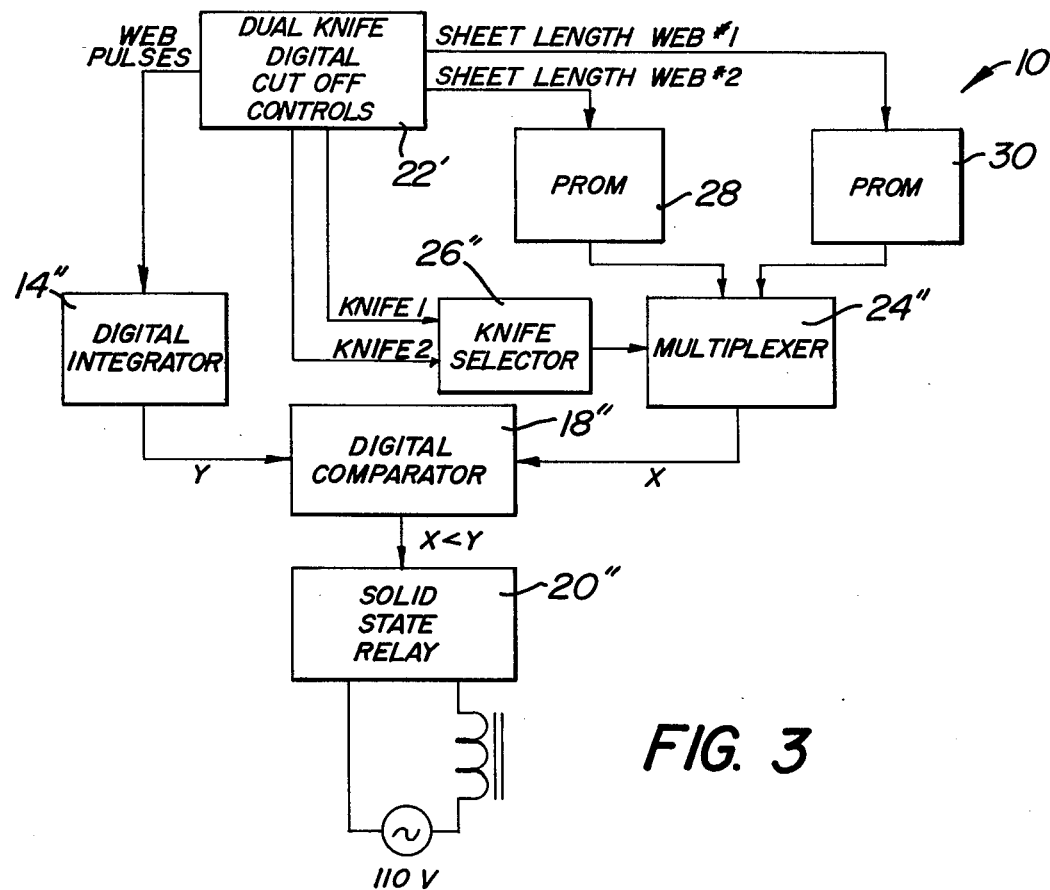
FIG. 3 is a block diagram of a maximum web speed monitor for limiting the speeds of at least two webs which are cut into sheets by discrete knife mechanisms having different operating characteristics in accordance with the principles of the present invention.

If the operating characteristics of the cyclic mechanisms are not identical or substantially the same, the embodiment of the invention shown in FIG. 3 may be employed to limit maximum web speed. The sheet length signals for the removing webs separately address PROMs 28 and 30. Each PROM stores information representative of the maximum permissible web speeds based on the operating characteristic of its associated cyclic mechanism. The outputs of the PROMs 28 and 30 are alternately supplied to digital comparator 18" by means of knife selector 26" and multiplexer 24". If, at the end of any sampling interval, the speed of either web exceeds the maximum permissible web speed corresponding to the operating characteristic of the associated cyclic mechanism, digital comparator 18" actuates solid state relay 20" to bring the web speed within acceptable limits.

Each of the components of the invention shown in FIGS. 1–3 comprise readily available logic modules. The modules are easily connectable without a multiplicity of complicated wiring networks. Each module can be rapidly tested and repaired or replaced with an identical module. The information representative of maximum permissible web speed — which is critical to the operation of the invention — can be easily programmed into the PROMs in the factory or in the field. Any variation in the operating characteristic of a cyclic mechanism may be readily compensated for by interchanging one programmed PROM for another differently programmed PROM.

The present invention may be embodied in other specific forms without departing from the spirit or essential attributes thereof and, accordingly, reference should be made to the appended claims, rather than to the foregoing specification as indicating the scope of the invention.

I claim:

1. A maximum web speed monitor for limiting the speed of a moving web which is cut into sheets by a knife in a cut-off machine having means for providing a signal indicative of the actual length of a sheet cut by the knife from the moving web based on the speed of the knife and means for providing a signal indicative of the speed of the web, comprising:
   first means for repetitively providing a sample signal indicative of the actual speed of the moving web during a preselected sampling interval based on said web speed signal,
   second programmable means addressable by said actual sheet length signal for storing information representative of the maximum permissible speed of the web as a function of sheet length based on said sampling interval, and
   comparator means operatively associated with said first and second means for comparing said stored maximum permissible speed information to said sample signal substantially instantaneously with the production of said actual sheet length signal and for providing a signal indicative of whether the web speed exceeds a maximum permissible speed.

2. The maximum web speed monitor in accordance with claim 1 wherein said second means is a PROM.

3. The maximum web speed monitor in accordance with claim 2 including a relay operatively associated with said comparator means.

4. A maximum web speed monitor for limiting the speed of a moving web which is cut into sheets by a rotary knife in a cut-off machine having means for providing a signal indicative of the actual length of a sheet cut by the rotary knife from a moving web based on the speed of the rotary knife and means for providing a signal indicative of the speed of the web, comprising:
   first means for repetitively providing a sample signal indicative of the actual speed of the moving web during a preselected sampling interval based on said web speed signal,
   a PROM addressable by said actual sheet length signal for storing information representative of the maximum permissible speed of the web as a function of sheet length based on said sampling interval,
   a comparator operatively associated with said first means and said PROM, and
   a relay connected to said comparator for preventing the web speed from exceeding a maximum permissible speed.

5. A web speed monitor for limiting the speeds of at least two moving webs which move at the same speed and which are cut into sheets by at least two discrete knives in a cut-off machine having means for providing first and second signals indicative of the actual lengths of sheets cut by first and second knives in the cut-off machine from the moving webs based on the speeds of said first and second knives and means for providing a signal indicative of the speed of the webs, comprising:
   first means for repetitively providing a sample signal indicative of the actual speeds of the webs during a preselected sampling interval based on said web speed signal,
   second programmable means addressable by said first and second actual sheet length signals for storing information representative of the maximum permissible speeds of the webs as a function of sheet length based on said sampling interval, and
   comparator means operatively associated with said first and second means for providing a signal indicative of whether the web speeds exceed a maximum permissible speed.

6. The web speed monitor in accordance with claim 5 wherein said second means includes a multiplexer for transmitting said first and second signals to said second programmable means.

7. A web speed monitor for limiting the speeds of at least two moving webs which move at the same speed and which are cut into sheets by at least two discrete knives in a cut-off machine having means for providing first and second signals indicative of the actual lengths of sheets cut by first and second knives in the cutoff machine from the moving webs based on the speeds of said first and second knives, comprising:
   first means for repetitively providing a sample signal indicative of the actual speed of the webs during a preselected sampling interval based on said web speed signal,
   at least two PROMs, each PROM being separately programmable with information representative of maximum permissible web speeds as a function of the operating characteristic of one of said first and second knives, each of said PROMs being addressable by said first and second actual sheet length signals, comparator means operatively associated with each of said PROMs and said first means for providing a signal indicative of whether the web speeds exceed a maximum permissible speed, and a multiplexer connected to each of said PROMs and said comparator means for transmitting said stored information to said comparator means.

8. A method of preventing the speed of a moving web which is cut into sheets by a knife, exceeding a maximum permissible speed, comprising:

automatically providing a signal indicative of the actual length of a sheet cut by a knife from a moving web based on the speed of the knife, automatically providing repetitive sample signals indicative of the actual speeds of the moving web based on preselected sampling intervals, programmably storing information representative of the maximum permissible speed of the web as a function of sheet length based on said sampling intervals, and automatically comparing said sample signals to said stored information to determine whether the web speed exceeds a maximum permissible speed.

* * * * *